(12) United States Patent
Lin et al.

(10) Patent No.: US 11,837,949 B2
(45) Date of Patent: Dec. 5, 2023

(54) ELECTRONIC DEVICE, PROTECTION CIRCUIT AND PROTECTION METHOD USING THE SAME

(71) Applicant: LITE-ON TECHNOLOGY CORPORATION, Taipei (TW)

(72) Inventors: Wei-Ting Lin, Taipei (TW); Han-Ju Chiang, Taipei (TW); Chih-Tai Chen, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 17/721,878

(22) Filed: Apr. 15, 2022

(65) Prior Publication Data

US 2023/0223837 A1 Jul. 13, 2023

(30) Foreign Application Priority Data

Jan. 12, 2022 (TW) .................................. 111101284

(51) Int. Cl.
  *H02M 1/32* (2007.01)
  *H02H 3/20* (2006.01)
  *H02M 3/335* (2006.01)
  *H02H 7/125* (2006.01)

(52) U.S. Cl.
  CPC .............. *H02M 1/32* (2013.01); *H02H 3/207* (2013.01); *H02H 7/1252* (2013.01); *H02M 3/33507* (2013.01)

(58) Field of Classification Search
  CPC ........ H02M 1/32; H02H 3/207; H02H 7/1252
  See application file for complete search history.

(56) References Cited

U.S. PATENT DOCUMENTS

| 4,628,430 A | * | 12/1986 | Mastner | .................. | H02M 1/36 363/48 |
| 2019/0115841 A1 | * | 4/2019 | Maruyama | ........ | H02M 3/33523 |

FOREIGN PATENT DOCUMENTS

| CN | 1479424 A | 3/2004 |
| CN | 110994998 A | 4/2020 |

OTHER PUBLICATIONS

Taiwan Office Action corresponding to Application No. 111101284 and dated Aug. 2, 2022, 10 pages.

* cited by examiner

*Primary Examiner* — Scott Bauer
(74) *Attorney, Agent, or Firm* — Innovation Counsel LLP

(57) ABSTRACT

A protection circuit including an auxiliary winding, a rectifier unit, the filter unit, a voltage divider unit and a controller is provided. The auxiliary winding is configured to induce an AC voltage. The rectifier unit is coupled to the auxiliary winding and configured to rectify the AC voltage into a DC voltage. The filter unit is coupled to the rectifier unit and configured to filter the DC voltage into a DC filter voltage. The voltage divider unit is coupled to the rectifier unit and the filter unit to transmit the DC filter voltage. The controller is coupled to the voltage divider unit and configured to detect a partial voltage of the DC filter voltage and detect whether to activate a protection mechanism according to the partial voltage.

18 Claims, 4 Drawing Sheets

# US 11,837,949 B2

1

ELECTRONIC DEVICE, PROTECTION CIRCUIT AND PROTECTION METHOD USING THE SAME

This application claims the benefit of Taiwan application Serial No. 111101284, filed Jan. 12, 2022, the subject matter of which is incorporated herein by reference.

BACKGROUND OF THE INVENTION

Field of the Invention

The invention relates in general to an electronic device, the protection circuit and a protection method using the same.

Description of the Related Art

Most generally-known power supplies provide power factor correction (PFC) function through a boost-type high voltage transformer, and after voltage is boosted, the bulk voltage is a high voltage (300V to 450V). However, feedback abnormality normally makes the voltage over-boosted and damage to the power supplies due to excessive bulk voltage. Therefore, it has become a prominent task for the industries to provide a protection circuit with over-voltage protection.

SUMMARY OF THE INVENTION

The invention is directed to an electronic device, a protection circuit and a protection method using the same capable of resolving the above problems.

According to one embodiment of the present invention, an electronic device is provided. The electronic device includes a protection circuit and a controller. The protection circuit includes an auxiliary winding, a rectifier unit, a filter unit and a voltage divider unit. The auxiliary winding is configured to induce an AC (Alternating Current) voltage. The rectifier unit is coupled to the auxiliary winding and configured to rectify the AC voltage into a DC (Direct Current) voltage. The filter unit is coupled to the rectifier unit and configured to filter the DC voltage into a DC filter voltage. The voltage divider unit is coupled to the rectifier unit and the filter unit to transmit the DC filter voltage. The controller is coupled to the voltage divider unit and configured to detect a partial voltage of the DC filter voltage and determine whether to activate an over-voltage protection mode or an under-voltage protection mode according to the partial voltage.

According to another embodiment of the present invention, a protection method is provided. The protection method includes the following steps: an AC voltage is induced by an auxiliary winding; the AC voltage is rectified into a DC voltage by a rectifier unit; the DC voltage is filtered into a DC filter voltage by a filter unit; a partial voltage of the DC filter voltage transmitted to a voltage divider unit is detected by a controller; and whether to activate an over-voltage protection mode or an under-voltage protection mode is determined according to the partial voltage by the controller.

According to an alternate embodiment of the present invention, a protection circuit is provided. The protection circuit is electrically connected to a controller. The protection circuit includes an auxiliary winding, a rectifier unit, a filter unit and a voltage divider unit. The auxiliary winding is configured to induce an AC voltage. The rectifier unit is coupled to the auxiliary winding and configured to rectify

2 the AC voltage into a DC voltage. The filter unit is coupled to the rectifier unit and configured to filter the DC voltage into a DC filter voltage. The voltage divider unit is coupled to the rectifier unit and the filter unit to transmit the DC filter voltage. The controller determines whether to activate an over-voltage protection mode or an under-voltage protection mode according to a partial voltage of the DC filter voltage.

DETAILED DESCRIPTION OF THE INVENTION

For the above and other aspects of the present invention to be better understood, a number of exemplary embodiments are disclosed below with detailed descriptions and accompanying drawings.

Figure 1:
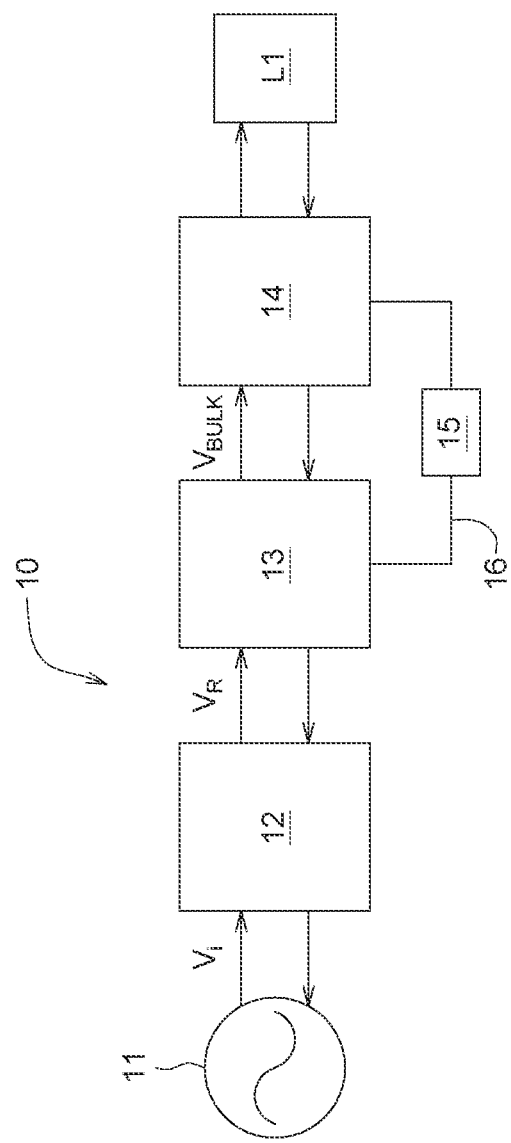
FIG. 1 is a functional diagram of an electronic device according to an embodiment of the present invention.
Figure 2:
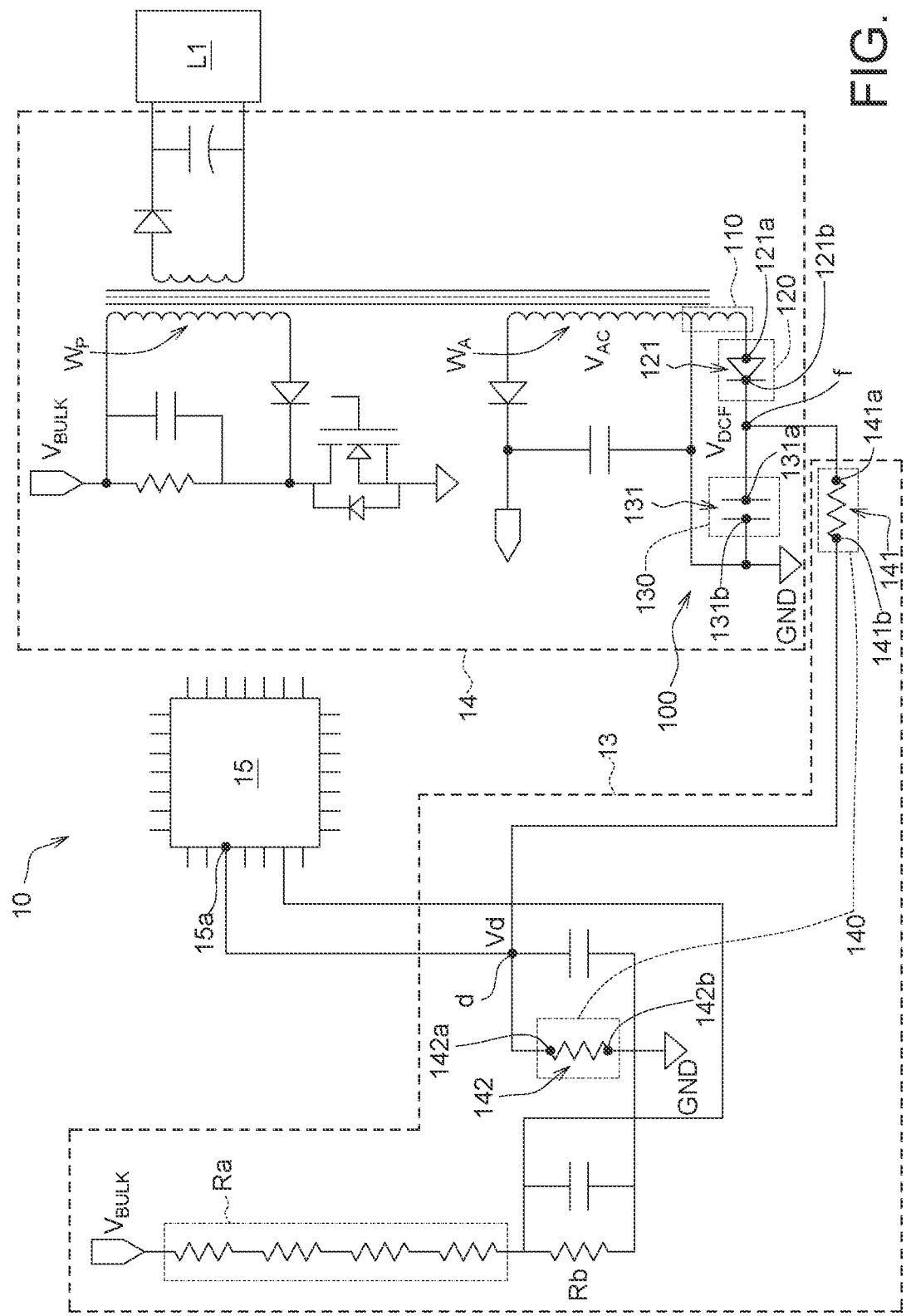
FIG. 2 is a partial circuit diagram of an electronic device according to an embodiment of the present invention.

Refer to FIGS. 1 to 2, FIG. 1 is a functional diagram of an electronic device 10 according to an embodiment of the present invention, and FIG. 2 is a partial circuit diagram of an electronic device 10 according to an embodiment of the present invention.

As illustrated in FIG. 1, the electronic device 10 includes a rectifier 12, a high voltage transformer 13, a voltage transformer 14, a controller 15 and a protection circuit 100 (the protection circuit 100 is illustrated in FIG. 2). The controller 15 could be realized by such as a Digital Signal Process (DSP). The electronic device 10 is exemplified by a power supply. Since the power supply uses a flyback transformer, the voltage transformer 14 is a flyback transformer. The rectifier 12, the high voltage transformer 13, the voltage transformer 14 and/or the controller 15 could be realized by circuits manufactured using a semiconductor manufacturing process.

As illustrated in FIG. 1, the AC power source 11 is configured to provide an AC voltage Vi to the electronic device 10; the rectifier 12 is configured to convert the AC voltage $V_i$ into a rectified voltage $V_R$; the high voltage transformer 13 is configured to convert the rectified voltage $V_R$ into a high voltage $V_{BULK}$. The high voltage $V_{BULK}$ is converted into a suitable working voltage (voltage transformation) by the voltage transformer 14 and then is outputted to a load L1. As illustrated in FIGS. 1 and 2, the high voltage transformer 13 at least includes feedback resistors Ra and Rb. The voltage transformer 14 further includes a primary winding $W_P$ and an auxiliary winding $W_A$. The primary winding $W_P$ and the auxiliary winding $W_A$ are such as secondary windings. When abnormality occurs to the feedback resistors Ra and Rb (for example, the feedback resistor Ra is open-looped or the feedback resistor Rb is short-circuited), the high voltage $V_{BULK}$ will immediately boost, and over-voltage problem will incur. However, the protection circuit 100 determines whether the high voltage $V_{BULK}$ is abnormal or not, and then activates the protection mechanism if the high voltage $V_{BULK}$ is abnormal. For example, the protection circuit 100 could control the high voltage transformer 13 through the control circuit 16 to activate the protection mechanism. The structure of the protection circuit 100 is elaborated below.

As illustrated in FIG. 2, the protection circuit 100 includes an auxiliary winding 110, a rectifier unit 120, a filter unit 130 and a voltage divider unit 140. The rectifier unit 120, the filter unit 130 and/or the voltage divider unit 140 could be realized by such as circuits formed by a semiconductor manufacturing process. The protection circuit 100 could be formed, arranged or integrated on the voltage transformer 14 and/or the high voltage transformer 13. For example, one or some of the elements of the protection circuit 100 could be formed, arranged or integrated on the high voltage transformer 13, and the other one or ones could be formed, arranged or integrated on the voltage transformer 14. In an embodiment, the auxiliary winding 110, the rectifier unit 120 and the filter unit 130 could be formed, arranged or integrated on the voltage transformer 14, and the voltage divider unit 140 could be formed, arranged or integrated on the high voltage transformer 13. Additionally, the auxiliary winding 110 could be at least a part of the auxiliary winding $W_A$; or, the auxiliary winding 110 and the auxiliary winding $W_A$ are two independent elements, wherein the auxiliary winding 110 is connected to the auxiliary winding $W_A$.

As illustrated in FIG. 2, based on the winding ratio of the primary winding $W_P$ and the auxiliary winding $W_A$ (voltage), the AC voltage (low voltage) $V_{AC}$ which is proportional to high voltage $V_{BULK}$ could be obtained. The auxiliary winding 110 is configured to induce an AC voltage $V_{AC}$. The rectifier unit 120 is coupled to the auxiliary winding 110 and configured to rectify the AC voltage $V_{AC}$ into a DC voltage VDC (not marked). The filter unit 130 is coupled to the rectifier unit 120 and configured to filter the DC voltage VDC into a DC filter voltage $V_{DCF}$. The voltage divider unit 140 is coupled to the rectifier unit 120 and the filter unit 130 to transmit the DC filter voltage $V_{DCF}$. The controller 15 is coupled to the voltage divider unit 140 and configured to detect a partial voltage $V_d$ of the DC filter voltage $V_{DCF}$ and determine whether to activate a protection mechanism according to the partial voltage $V_d$.

In other words, the AC voltage $V_{AC}$ induced by the auxiliary winding 110 is rectified and filtered into a DC filter voltage $V_{DCF}$ by the rectifier unit 120 and the filter unit 130 and the partial voltage $V_d$ is obtained by the voltage divider unit 140. The controller 15, according to the value of the partial voltage $V_d$, determines whether to activate a protection mechanism and the type of the protection mechanism.

As illustrated in FIG. 2, in the present embodiment, the rectifier unit 120 includes a diode 121, wherein a terminal 121a of diode 121 is coupled to the auxiliary winding 110, and another terminal 121b of the diode 121 is coupled to the filter unit 130. The filter unit 130 includes a capacitor 131, wherein a terminal 131a of the capacitor 131 is coupled to the rectifier unit 120, and another terminal 131b of the capacitor 131 is coupled to the ground potential GND. The terminal 131a of the capacitor 131 is coupled to the circuit between the terminal 121b of the diode 121 and the voltage divider unit 140. The voltage divider unit 140 includes a first resistor 141 and a second resistor 142 coupled to the first resistor 141, wherein the first resistor 141 is coupled to the rectifier unit 120 and the filter unit 130. The first resistor 141 has a terminal 141a and another terminal 141b. In the present embodiment, the terminal 141a, the terminal 121b and the terminal 131a are coupled to a node f (co-point), wherein the voltage of the node f is the DC filter voltage $V_{DCF}$. The second resistor 142 is coupled to the ground potential GND. For example, the second resistor 142 has a terminal 142a and another terminal 142b, wherein the terminal 142a is coupled to the terminal 141b of the first resistor 141, and the terminal 142b is coupled to the ground potential GND.

The structure and/or connection relationship of the rectifier unit 120, the filter unit 130 and/or the voltage divider unit 140 of the embodiments of the present invention are not limited to the above exemplifications and may include other types of circuit structure as long as the desired functions of the present invention could be achieved.

As illustrated in FIG. 2, the partial voltage $V_d$ could be the voltage of a node d between the first resistor 141 and the second resistor 142. The controller 15 is configured to detect the partial voltage $V_d$ and determine whether to activate a protection mechanism according to the partial voltage Va. The protection mechanism includes an over-voltage protection mode or an under-voltage protection mode.

Let the over-voltage protection mode be taken for example. The controller 15 is further configured to: determine whether the partial voltage $V_d$ is equivalent to or greater than the first set voltage value; and activate the over-voltage protection mode if the partial voltage $V_d$ is equivalent to or greater than the first set voltage value. Let the under-voltage protection mode be taken for example. The controller 15 is further configured to: determine whether the partial voltage $V_d$ is equivalent to or less than the second set voltage value; and activate an under-voltage protection mode if the partial voltage $V_d$ is equivalent to or less than the second set voltage value.

The method for generating (or obtaining) the first set voltage value is disclosed below.

As indicated in formula (1), Vs represents the set voltage value of the detection port 15a of the controller 15; $R_{141}$ represents the resistance of the first resistor 141; $R_{142}$ represents the resistance of the second resistor 142; $V_{D1}$ represents the forward conducted voltage of the diode 121; NP represents the number of coils of the primary winding $W_P$, $N_{110}$ represents the number of coils of the auxiliary winding 110. By substituting the known values of the resistance $R_{141}$, resistance $R_{142}$, the number of coils of the primary winding NP, the number of coils of the auxiliary winding $N_{110}$ and high voltage $V_{BULK}$ into formula (1), the corresponding set voltage value Vs could be obtained as follows:

$$\left(V_S \times \frac{R_{141} + R_{142}}{R_{142}} + V_{D1}\right) \times \frac{N_P}{N_{110}} = V_{BULK} \quad (1)$$

Let the over-voltage protection mode be taken for example. The high voltage $V_{BULK}$ is exemplified by 481.5 volts (V); the resistance $R_{141}$ is exemplified by 30K ohms; the resistance $R_{142}$ is exemplified by 4.99K ohms; the number of coils of the primary winding NP is exemplified by 62; the number of coils of the auxiliary winding $N_{110}$ is exemplified by 3. By substituting these values into formula (1), the corresponding set voltage value Vs could be obtained as 3.18V, which is the first set voltage value disclosed above. When the detection port 15a of the controller 15 detects that the partial voltage $V_d$ has reached 3.18V, the controller 15 could activate the over-voltage protection mode. As illustrated in FIG. 1, the controller 15 cuts off the high voltage transformer 13 through the control circuit 16, such that the high voltage transformer 13 could be immediately turned off (stop supplying voltage to the voltage transformer 14), and the technical effect of over-voltage protection could be implemented.

Let the under-voltage protection mode be taken for example. Suppose the value of the high voltage $V_{BULK}$ is changed to 250 volts (V) and other parameters remain unchanged. By substituting the above parameter values into formula (1), the corresponding set voltage value Vs could be obtained as 1.58 V, which is the second set voltage value disclosed above. When the detection port 15a of the controller 15 detects that the partial voltage $V_d$ has reached 1.58 V, the under-voltage protection mode is activated. As illustrated in FIG. 1, the controller 15 cuts off the high voltage transformer 13 through the control circuit 16, such that the high voltage transformer 13 could be immediately turned off (stop supplying voltage to the voltage transformer 14), and the technical effect of under-voltage protection could be implemented.

Figure 3:
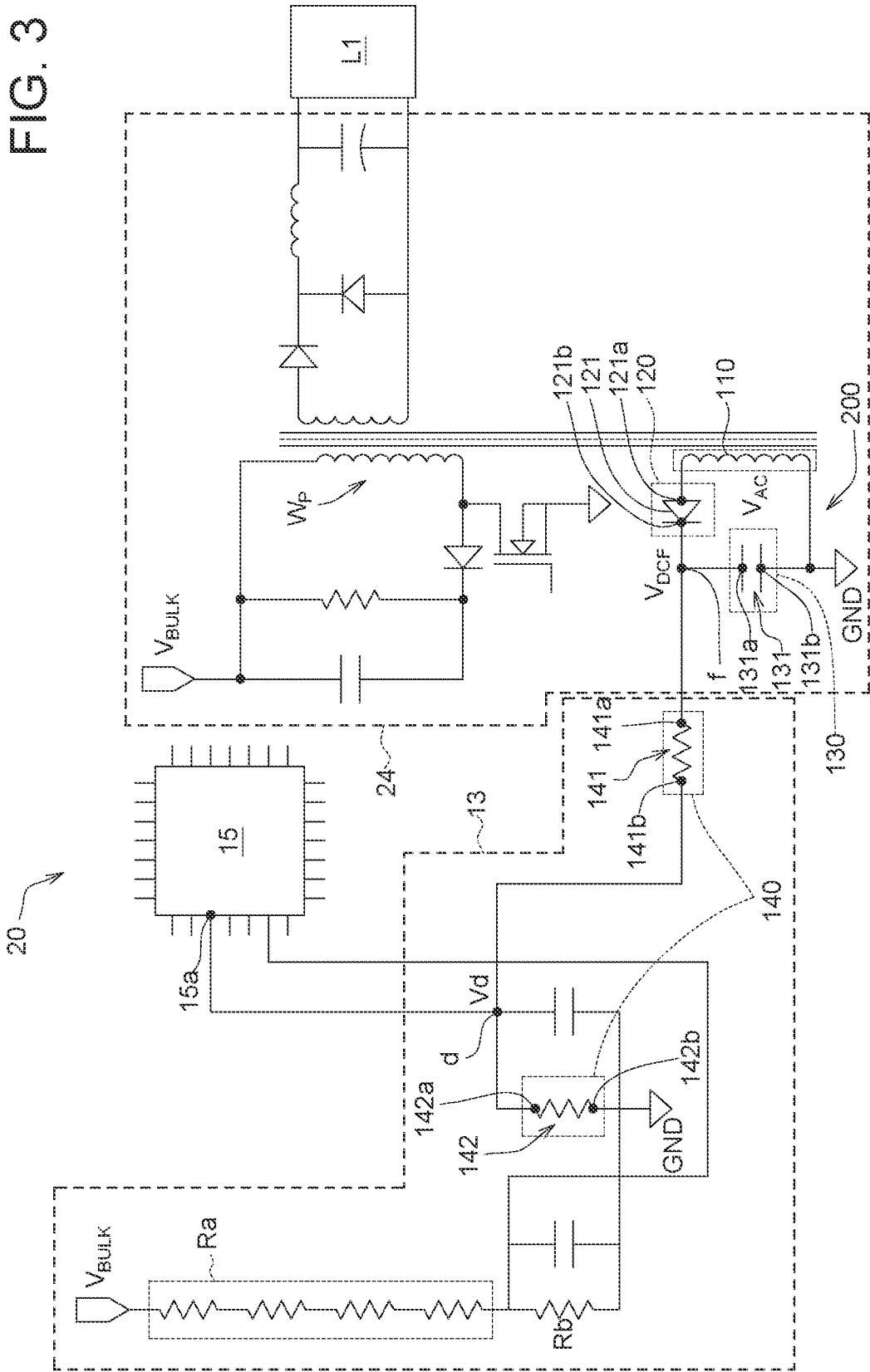
FIG. 3 is a partial circuit diagram of an electronic device according to another embodiment of the present invention.

Referring to FIG. 3, a partial circuit diagram of an electronic device 20 according to another embodiment of the present invention is shown. The electronic device 20 includes a rectifier 12 (not illustrated), a high voltage transformer 13, a voltage transformer 24, a controller 15 and a protection circuit 200. The protection circuit 200 includes an auxiliary winding 110, a rectifier unit 120, a filter unit 130 and a voltage divider unit 140. Technical features of the protection circuit 200 of the present embodiment are similar or identical to that of the protection circuit 100, and the similarities are not repeated here. In the present embodiment, since the electronic device 20 uses a forward transformer, the voltage transformer 24 is a forward transformer.

Moreover, the protection circuit 100 or 200 could also use other voltage mode of voltage transformer, and is not limited to the said exemplifications in the embodiments of the present invention.

Figure 4:
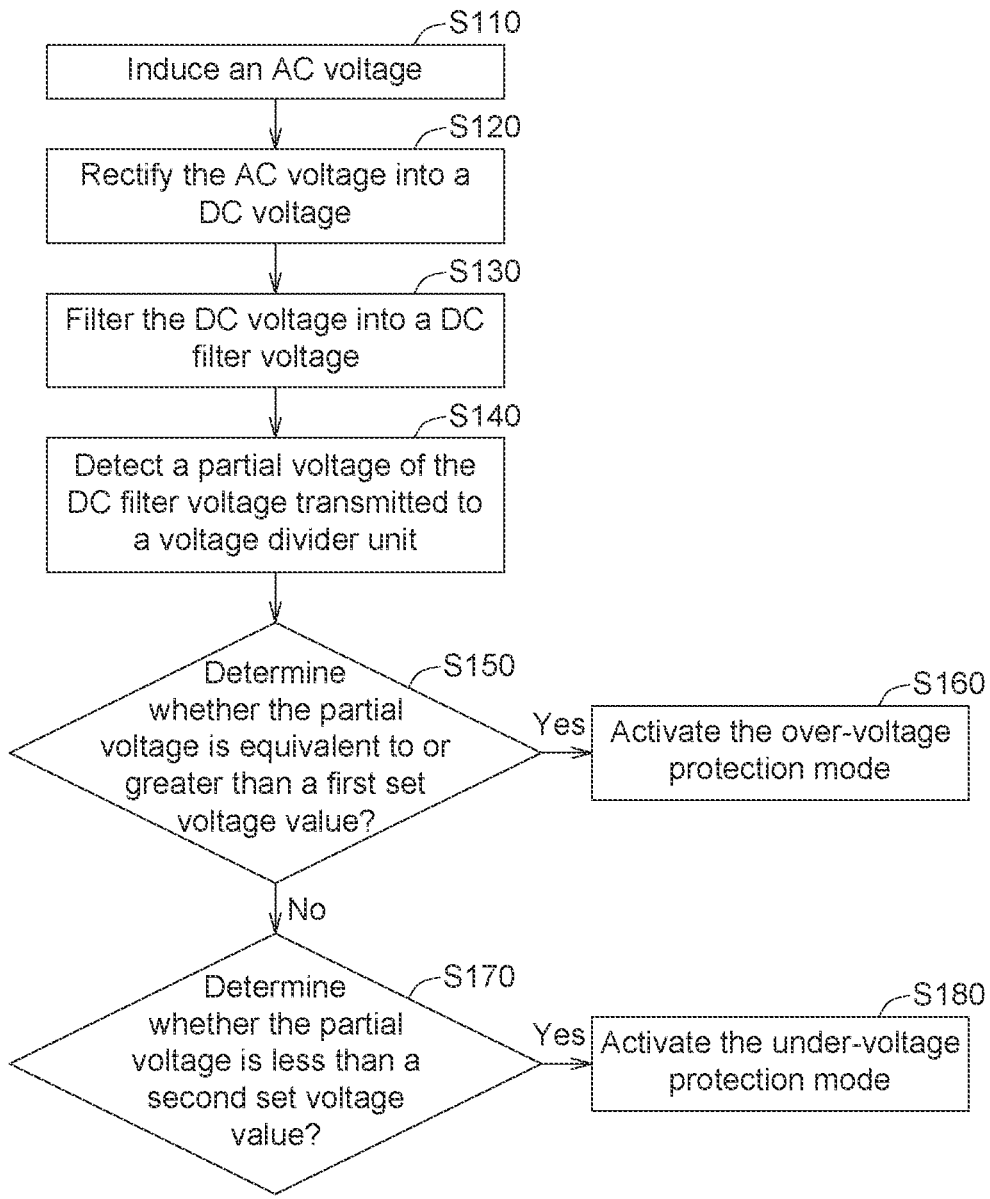
FIG. 4 is a flowchart of a protection method of the electronic device of FIG. 1.

Referring to FIG. 4, a flowchart of a protection method of the electronic device 10 of FIG. 1. The protection method could be used in the protection circuit 100 of FIG. 2 or the protection circuit 200 of FIG. 3.

In step S110, an AC voltage $V_{AC}$ is induced by the auxiliary winding 110.

In step S120, the AC voltage $V_{AC}$ is rectified into a DC voltage VDC (not illustrated) by the rectifier unit 120.

In step S130, the DC voltage VDC is filtered into a DC filter voltage $V_{DCF}$ by the filter unit 130.

In step S140, a partial voltage $V_d$ of the DC filter voltage $V_{DCF}$ is detected by the controller 15.

In step S150, whether the partial voltage $V_d$ is equivalent to or greater than the first set voltage value is determined by the controller 15. If the partial voltage $V_d$ is equivalent to or greater than the first set voltage value, the method proceeds to step S160, the over-voltage protection mode is activated. If the partial voltage $V_d$ is not equivalent or greater than the first set voltage value, the method proceeds to step S170.

In step S170, whether the partial voltage $V_d$ is less than the second set voltage value is determined by the controller 15. If the partial voltage $V_d$ is less than the second set voltage value, the method proceeds to step S180, an under-voltage protection mode is activated. If the partial voltage $V_d$ is not less than the second set voltage value, the controller 15 maintains the current operation mode, that is, the protection mechanism is not activated. The first set voltage value is greater than the second set voltage value. In another embodiment, the step S170 could be omitted.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic device, comprising:
   a protection circuit, comprising:
   an auxiliary winding configured to induce an AC voltage;
   a rectifier unit coupled to the auxiliary winding and configured to rectify the AC (Alternating Current) voltage into a DC (Direct Current) voltage;
   a filter unit coupled to the rectifier unit and configured to filter the DC voltage into a DC filter voltage; and
   a voltage divider unit coupled to the rectifier unit and the filter unit to transmit the DC filter voltage; and
   a controller coupled to the voltage divider unit and configured to:
   detect a partial voltage of the DC filter voltage; and
   determine whether to activate an over-voltage protection mode or an under-voltage protection mode according to the partial voltage;
   wherein the voltage divider unit is connected to a trace between the filter unit and the rectifier unit.

2. The electronic device according to claim 1, wherein the controller is further configured to:
   determine whether the partial voltage is equivalent to or greater than a first set voltage value; and
   activate the over-voltage protection mode if the partial voltage is equivalent to or greater than the first set voltage value.

3. The electronic device according to claim 1, wherein the controller is further configured to:
   determine whether the partial voltage is less than a second set voltage value;
   activate the under-voltage protection mode if the partial voltage is less than the second set voltage value.

4. The electronic device according to claim 1, wherein the voltage divider unit comprises a first resistor and a second resistor coupled to the first resistor, the first resistor is coupled to the rectifier unit and the filter unit, and the second resistor is coupled to a ground potential; the controller is further configured to:
   detect the partial voltage of a node between the first resistor and the second resistor.

5. The electronic device according to claim 1, wherein the rectifier unit comprises a diode, a terminal of the diode is coupled to the auxiliary winding, and another terminal of the diode is coupled to the filter unit.

6. The electronic device according to claim 1, wherein the filter unit comprises a capacitor, a terminal of the capacitor is coupled to the rectifier unit, and another terminal of the capacitor is coupled to a ground potential.

7. A protection method, comprising:
   inducing an AC voltage by an auxiliary winding;
   rectifying the AC voltage into a DC voltage by a rectifier unit;
   filtering the DC voltage into a DC filter voltage by a filter unit;
   detecting a partial voltage of the DC filter voltage transmitted to a voltage divider unit by a controller; and
   determining whether to activate an over-voltage protection mode or an under-voltage protection mode according to the partial voltage by the controller;
   wherein the voltage divider unit is connected to a trace between the filter unit and the rectifier unit.

8. The protection method according to claim 7, further comprising:

determining whether the partial voltage is equivalent to or greater than a first set voltage value; and activating the over-voltage protection mode if the partial voltage is equivalent to or greater than the first set voltage value.

9. The protection method according to claim 7, further comprising:

determining whether the partial voltage is less than a second set voltage value;

activating the under-voltage protection mode if the partial voltage is less than the second set voltage value.

10. The protection method according to claim 7, wherein the voltage divider unit comprises a first resistor and a second resistor coupled to the first resistor, the first resistor is coupled to the rectifier unit and the filter unit, and the second resistor is coupled to a ground potential; the protection method further comprises:

detecting the partial voltage of a node between the first resistor and the second resistor.

11. The protection method according to claim 7, wherein the rectifier unit comprises a diode, a terminal of the diode is coupled to the auxiliary winding, and another terminal of the diode is coupled to the filter unit.

12. The protection method according to claim 7, wherein the filter unit comprises a capacitor, a terminal of the capacitor is coupled to the rectifier unit, and another terminal of the capacitor is coupled to a ground potential.

13. A protection circuit electrically connected to a controller, and comprising:

an auxiliary winding configured to induce an AC voltage;

a rectifier unit coupled to the auxiliary winding and configured to rectify the AC voltage into a DC voltage;

a filter unit coupled to the rectifier unit and configured to filter the DC voltage into a DC filter voltage; and a voltage divider unit coupled to the rectifier unit and the filter unit to transmit the DC filter voltage;

wherein the controller determines whether to activate an over-voltage protection mode or an under-voltage protection mode according to a partial voltage of the DC filter voltage;

wherein the voltage divider unit is connected to a trace between the filter unit and the rectifier unit.

14. The protection circuit according to claim 13, wherein if the partial voltage is equivalent to or greater than a first set voltage value, the controller activates the over-voltage protection mode.

15. The protection circuit according to claim 13, wherein if the partial voltage is less than a second set voltage value, the controller activates the under-voltage protection mode.

16. The protection circuit according to claim 13, wherein the voltage divider unit comprises a first resistor and a second resistor coupled to the first resistor, the first resistor is coupled to the rectifier unit and the filter unit, the second resistor is coupled to a ground potential, and the partial voltage is the voltage of a node between the first resistor and the second resistor.

17. The protection circuit according to claim 13, wherein the rectifier unit comprises a diode, a terminal of the diode is coupled to the auxiliary winding, and another terminal of the diode is coupled to the filter unit.

18. The protection circuit according to claim 13, wherein the filter unit comprises a capacitor, a terminal of the capacitor is coupled to the rectifier unit, and another terminal of the capacitor is coupled to a ground potential.

* * * * *